United States Patent [19]
Vacher

[11] 4,337,397
[45] Jun. 29, 1982

[54] APPARATUS FOR VISUALIZING A BODY BY DETECTING THE RADIATION OF A TRACER CONTAINED IN THIS BODY AND CONSISTING OF POSITRON EMITTERS

[75] Inventor: Jacques Vacher, Seyssinet, France
[73] Assignee: Commissariat a l'Energie Atomique, Paris, France
[21] Appl. No.: 112,812
[22] Filed: Jan. 17, 1980

[30] Foreign Application Priority Data
  Jan. 26, 1979 [FR] France .............................. 79 02053

[51] Int. Cl.$^3$ ............................................. G01T 1/20
[52] U.S. Cl. ................................. 250/363 S; 250/366
[58] Field of Search .................... 250/360, 363 S, 366, 250/367, 369, 445 T

[56] References Cited

U.S. PATENT DOCUMENTS 4,057,727  11/1977  Muehllehner et al. ............. 250/366
  4,150,292  4/1979   Ter-Pogossian ................. 250/363 S
  4,181,855  1/1980   Horrocks ........................... 250/366

OTHER PUBLICATIONS

Williams et al., "Design and Performance Characteristics of a Positron Emission Computed Axial Tomograph—ECAT ®II", IEEE Transactions on Nuc. Sci., vol. NS-26, No. 1, Feb. 1979, pp. 619–627.

Primary Examiner—Alfred E. Smith
Assistant Examiner—Janice A. Howell

[57] ABSTRACT

An apparatus for visualizing a body by detecting the radiation of a tracer contained in this body and consisting of positron emitters, comprising:
detection cells situated on each side of the body and permitting detection of the γ particles released by each positron emitter in two opposite directions;
means for locating cells arranged in pairs opposite one another, on each side of the body, each pair of opposing cells being located on a straight line passing through a positron emitter;
means for coding the location of said pairs of opposing cells;
means for memorizing these coded location signals;
means for processing these coded and memorized signals;
visualization means, controlled by the processing means, for visualizing the image of the body from the different signals coded and memorized, further comprising:
means connected to the detection cells for measuring the differences in travel time of the γ particles emitted by each emitter, towards corresponding pairs of opposing cells;
means for coding the values of these differences in travel times, these coding means being connected to the memorizing means for also memorizing coded signals representing the values of the differences in travel times, and so that the processing means receive the additional coded and memorized values representing the differences in travel times, for visualizing the image of the body.

14 Claims, 1 Drawing Figure

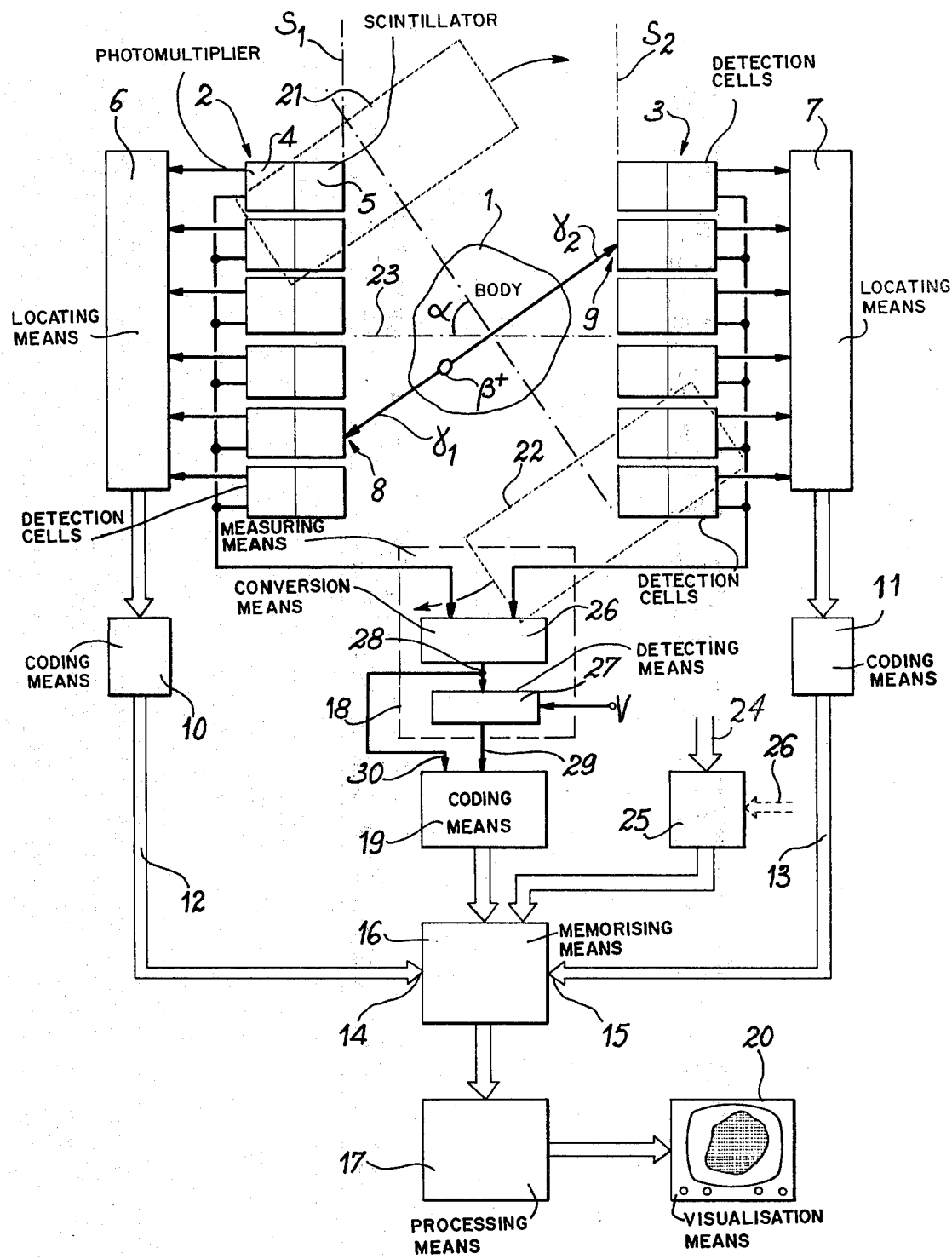

APPARATUS FOR VISUALIZING A BODY BY DETECTING THE RADIATION OF A TRACER CONTAINED IN THIS BODY AND CONSISTING OF POSITRON EMITTERS

BACKGROUND OF THE INVENTION

The present invention relates to an apparatus for visualising a body, by detecting the radiation of a tracer contained in this body and consisting of positron emitters. This apparatus can be used particularly in tomography and hence for the visualisation of an organ section, in a given sectional plane.

The principle of the operation of this apparatus is based on the measurement of the radiation emitted by a tracer injected into the body or organ which is to be examined.

It is known to obtain a gammagraphic image of a body containing a tracer, by means of a camera sensitive to gamma radiation. This camera has an optical system consisting of a collimator which selects only those gamma rays whose trajectories are perpendicular to the plane of observation; the other radiation is lost and the effectiveness of such a camera is therefore greatly reduced. Moreover, visualisation of the body results from the superimposing of sections through planes perpendicular to the direction of collimation.

A camera is also known which operates on the basis of positron detection and is known under the name of the positron Gamma camera of the "coordinate reconstituting" type. In this case, a tracer consisting of positron emitters is injected into the body which is to be visualised. The positrons dematerialise almost instantaneously into two gamma radiations emitted in two opposite directions. The geometric locus of the point of emission of these two sets of radiation is therefore a straight line which is determined by two detectors. The numbers of these two detectors are recorded; by using a computer to process this information, the coordinates of the point of emission can be reconstituted. This type of camera has the advantage of avoiding the need for collimation means and thus considerably increasing the number of items of information available compared with the camera mentioned hereinbefore. In these positron gamma-cameras, the number of disintegrations registered in a specific time as coming from one point is a function of the density of the tracer at this point, thus making it possible to build up a picture of the distribution of the tracer.

However, in these positron gamma-cameras of the coordinate-reconstituting type, the detectors used are generally detectors using sodium iodide doped with thallium. These detectors are very effective, but they do not give acceptable time resolutions for measuring the travel times.

It is also known to produce a positron gamma-camera using only measurements of travel times, i.e. a camera wherein the point of emission of the gamma rays is located, on the straight line joining the two detectors, by measuring the difference between the travel times of the two sets of radiation. With this type of camera, better time resolution can be obtained, thanks to the use of plastic scintillators. However, localisation thus achieved, solely by measuring the travel times, is not sufficiently precise, unless the efficiency of the system is unreasonably sacrificed. To obtain an image the quality of which was equivalent to that of conventional positron cameras, the measuring times would have to be increased within limits which are unacceptable in the gamma photography of the human body. In fact, the shorter the measuring time, the less time it takes to treat the patient, thus making it possible to use tracers with a very short life, which are greatly preferable as regards the patient's health when an organ or part of the body is to be tomographed or visualised.

BRIEF SUMMARY OF THE INVENTION

The aim of this invention is to remedy the disadvantages of the cameras described hereinbefore, and more particularly to provide an apparatus for visualising a body, by detecting the radiation of a tracer contained in this body, this apparatus being more effective than the coordinate-reconstituting gamma cameras or the cameras which measure travel times, and thus reducing the time taken to treat the patient and therefore permitting the use of tracers with a very short half-life.

The present invention relates to an apparatus for visualising a body by detecting the radiation of a tracer contained in this body and consisting of positron emitters, comprising:

detection cells located on each side of the body, permitting the detection of the $\gamma$ particles delivered by each positron emitter, in two opposite directions;

means for locating cells arranged in opposite pairs on each side of the body, each pair of opposite cells being located on a straight line passing through a positron emitter;

means for coding the location of said pairs of opposing cells;

means for memorising these coded location signals;

means for processing these memorised signals;

visualisation means controlled by the processing means, for visualising the image of the body from the different coded, memorised signals.

This apparatus is characterised in that it further comprises:

means connected to the detection cells, for measuring the differences in travel times of the $\gamma$ particles delivered by each emitter, towards the corresponding pairs of opposing cells;

means for coding the values of these differences in travel times, these coding means being connected to the memorising means for also memorising coded signals representing the values of the differences in travel times, processing means receiving, for the purpose of visualising the image of the body, the supplementary coded and memorised values representing the values of the differences in travel times.

According to another feature of the invention, the means for measuring the differences in travel times comprise means for converting time into amplitude.

According to another feature of the invention, the means for measuring the differences in travel times also comprise means for detecting the amplitude threshold, which are connected to the time-to-amplitude conversion means for eliminating from the measurements those wherein the amplitude exceeds a predetermined amplitude threshold.

According to another feature, the predetermined threshold corresponds to the maximum possible difference in travel times, this maximum difference being dependent on the dimensions of the body which is to be visualised.

The invention also relates to an apparatus for visualising a body by detecting the radiation of a tracer contained in this body and consisting of positron emitters, comprising:

detection cells located on each side of the body and permitting the detection of the γ particles delivered by each positron emitter in two opposing directions;

means for locating cells arranged in opposing pairs, on each side of the body, each pair of opposing cells being situated on a straight line passing through a positron emitter;

means for coding the location of said pairs of opposing cells;

means for memorising these coded locating signals;

means for processing these coded, memorised signals;

visualisation means, controlled by the processing means, for visualising the image of the body from the different coded and memorised signals; this apparatus being characterised in that each detection cell comprises a caesium fluoride scintillator.

BRIEF DESCRIPTION OF THE DRAWING

Further features and advantages of the invention will be more readily understood from the following description, given solely as an illustration, with reference to the accompanying drawing. This drawing schematically shows a visualisation apparatus according to the invention.

DETAILED DESCRIPTION OF THE PREFERRED EMBODIMENTS

Referring to the FIGURE, it shows an apparatus for tomography of a body or an organ 1, by detecting the radiation of a tracer contained in this body. According to the invention, this tracer consists of positron emitters; one of these emitters is marked $\beta^+$ in the FIGURE. As indicated hereinbefore, each positron emitter splits almost instantaneously into two sets of gamma radiation with opposite directions; these sets of radiation are shown as $\gamma_1$ and $\gamma_2$ in the FIGURE; this emission of gamma rays is accompanied by the liberation of 511 kiloelectronvolts of energy. The apparatus comprises two groups of cells 2, 3 for the detection of γ rays, located on each side of the body to be analysed; these cells make it possible to detect the gamma particles emitted by each positron emitter, in two opposite directions. Each of these detection cells consists of a plastic scintillator 5, associated with a photomultiplier 4. The apparatus also comprises locating means 6, 7 by means of which it is possible to locate, in the groups of opposing cells, the pairs of cells which detect gamma radiation emanating from the disintegration of one positron and which are thus respectively situated on straight lines passing, respectively, through positron emitters; in the embodiment shown in the drawing, it is the cells 8, 9 which are located by means of the means 6, 7, for the emitter $\beta^+$ in question. These two cells are in fact situated on a straight line passing through a positron emitter $\beta^+$. These locating means are of known construction and comprise, in particular, amplitude selection channels for the detection signals obtained from the opposing cells of each pair located. The amplitude selection channels make it possible to locate only two cells, each belonging to a different group of opposing cells, the detection signals of which have an amplitude within a predetermined range. The means 6, 7 for locating the opposing cells are connected to coding means 10, 11 which deliver coded signals for locating the pairs of opposing cells which have detected two sets of gamma rays in opposite directions. The respective outputs 12, 13 of these coding means are connected to the recording inputs 14, 15 of the memorising means 16, consisting for example of a live memory. Processing means 17, consisting of a computer, are connected to the memorising means 18 and are used for processing the signals and values encoded and memorised in these memorising means. The apparatus shown in the drawing also comprises means 18 for measuring the differences in travel times of the gamma particles such as $\gamma_1$ and $\gamma_2$ emitted by each emitter $\beta^+$ towards the corresponding pairs of opposing cells, such as 8 and 9. This travel time information reduces the spatial range in which to look for the presence of each positron emitter. In fact, thanks to the means 18, the "distribution" distance can be reduced with the apparatus according to the invention, i.e. the distance over which each positron emitter has to be looked for on the corresponding straight line passing through the two opposing cells which have detected the radiation of this emitter. In the known apparatus, this distribution distance corresponds to the largest dimension of the body which is to be visualised. Thanks to the apparatus according to the invention, this distance is at least five times less and this means that the search for each emitter is made easier, the searching time is shorter, thus making it possible to use tracers with a short half life and thus reduce the time taken to treat patients in tomographic analysis.

The means 18 for measuring the difference in travel times receive impulses from the detection of γ rays picked up by each pair of opposing cells. These cells comprise time-to-amplitude conversion means 26 consisting in known manner of a circuit generating voltage gradients; these means 26 are associated with amplitude threshold detecting means 27 which themselves consist in known manner of a voltage comparison circuit. The first impulse which reaches the time-to-amplitude conversion means 26 causes the creation of a voltage gradient on the output 28 of these conversion means. In the apparatus shown in the drawing, the triggering of this voltage gradient may be caused, for example, by the impulse coming from the detection cell 8. The second impulse coming from the opposite cell 9 causes stoppage of this voltage gradient.

The value of the voltage attained by the gradient at the moment when the second impulse occurs corresponds to the difference in travel times of the particles $\gamma_1$ and $\gamma_2$ to reach the respective cells 8 and 9. In the detection means 27, the value of this voltage is compared with a voltage threshold V representing the maximum time which a γ particle would take to travel the maximum dimension of the organ or body which is to be visualised. In fact, these means for measuring the differences in travel times will eliminate all the measurements of differences which cannot be taken into account; this is the case, for example, when parasitic impulses not suppressed by the amplitude selection and coming from two opposite detection cells reach the conversion means 26; each time the voltage threshold V is not exceeded, the detection means 27 authorise, by a validation signal appearing at an outlet 29, the encoding of the signal representing the difference in travel times; this signal is encoded in coding means 19 connected by their input 30 to the output 28 of the time-to-amplitude conversion means 26. These coding means 19 are connected to the memorising means 16 which, as indicated hereinbefore, make it possible also to memorise the coded locating signals of the pairs of opposing cells situated on straight lines passing through positron emitters. These memorising means therefore make it possible to memorise coded signals representing the numbers of the cells belonging to two groups of opposing cells and the values of the differences in travel time of the gamma particles, to reach the opposing cells located.

As a result, the processing means 17 receive coded signals relating to the straight trajectories of the gamma particles delivered by the positron emitters, coded signals relating to the differences in time taken by the particles from one positron emitter to travel their trajectories and reach the pairs of opposing cells. Visualisation means 20 controlled by the processing means 17 then make it possible to visualise the image of the body or organ 1, by processing the different signals and values encoded and memorised in the means 16. The image of the body or organ, obtained on display means 20, for example of the cathode type with a memory, comprises parts showing greater or lesser contrast depending on the numbers of disintegrations detected by the cells. This contrast is, of course, a function of the density of the tracer in each part of the body or organ 1.

Various types of scintillator may be used in the apparatus according to the invention.

Sodium iodide doped with thallium, which is currently used in conventional gamma cameras, has the disadvantage of poor temporal resolution, but has the advantage of being highly effective; in all, in a positron-type gamma camera using coordinate reconstitution and fitted with a scintillator of this kind, the use of the travel time information according to the present invention results in a substantial improvement in the quality of the image, with the same number of events.

Plastic scintillators, which have much better temporal resolution but are considerably less effective, produce slightly better apparatus.

Obviously, the ideal scintillator for carrying out the invention is one which combines good efficacy with good temporal performance. In this respect, caesium fluoride definitely seems the most appropriate: in fact, it is at least as effective as NaI(Tl) and has a temporal performance almost equivalent to that of plastic scintillators.

As indicated hereinbefore, the invention also relates to an apparatus for detecting a body, by detecting the radiation of a tracer contained in this body, which comprises:

detection cells situated on each side of the body and permitting the detection of the $\gamma$ particles released by each positron emitter in two opposite directions;

means for locating cells arranged in pairs opposite one another, on each side of the body, each pair of opposing cells being situated on a straight line passing through a positron emitter;

means for encoding the location of said pairs of opposing cells;

means for memorising these coded location signals;

means for processing these coded, memorised signals;

visualisation means, controlled by the processing means, for visualising the image of the body from the different coded, memorised signals.

In this structure (not shown in the drawings), which corresponds to that of a positron-type gamma camera, the invention is based on the fact that each detection cell comprises a caesium fluoride scintillator. Generally, in the detectors of positron-type gamma cameras, the scintillator consists of sodium iodide doped with thallium.

Despite numerous studies and publications, until now those "skilled in the art" had not thought of CsF as a detector in positron-type visualisation apparatus, this being a field in which the poor light yield is not a disadvantage; on the one hand the spatial resolution is given by the juxtaposition of unitary crystals and on the other hand the resolution in energy is a much less important parameter than it is in conventional $\gamma$ cameras.

In this type of apparatus, two essential qualities are a criterion for the selection of the scintillator: high efficiency ensuring minimum loss of useful events and good temporal resolution making it possible to reduce the period of coincidence and thus eliminate as many chance coincidences as possible.

In fact, CsF (caesium fluoride) has a slightly greater efficiency than NaI Tl.

As for its temporal resolution, it is known that this improves if it is possible to recover a greater density of photoelectrons (number of photons per unit of time) from the photocathode of the photomultiplier associated with the scintillator.

Although it has a light yield 25 times less than that of NaI Tl (sodium iodide doped with thallium), CsF has a scintillation period 50 times shorter (5 ns instead of 250), and consequently the temporal density of photons produced is twice as great.

Moreover, CsF has a refractive index (n=1.48) which is very similar to that of the glass encapsulating the scintillator or the photocathode of the PM, whereas NaI has an index of n=1.75. Thus, the number of reflections and diffusions of parasitic light is smaller for CsF, thus improving the temporal photoelectron-producing density of CsF.

These qualities of CsF which give it an advantage for use as a detector in tomographs or positron-type visualisation apparatus of conventional kinds make it virtually irreplaceable in a travel-time visualisation apparatus wherein the temporal resolution is paramount.

In the exemplary embodiment of the apparatus shown in the drawing, the detection cells are assembled in two groups 2, 3 of identical cells situated, respectively, on two parallel line segments, on each side of the body; in tomography, in order to visualise a section through an organ, through 360°, it is necessary in this embodiment of the apparatus to move the groups of cells in rotation round the body 1, so as to scan the entire plane of section. Reference numerals 21, 22 in the FIGURE schematically show one of the intermediate positions which are occupied by the groups of cells 2, 3 during this rotation. Of course, these two groups of cells are associated with means (not shown) enabling them to be driven in rotation around the body 1. In this embodiment of the apparatus, bearing means (not shown) make it possible to find out at any time the value of the angle $\alpha$ of rotation of the two groups of cells, in relation to a reference position 23, for example. These bearing means for the angle $\alpha$ of rotation are connected to an input 24 of coding means 25 by means of which the bearing signals for the angle of rotation of the groups of detection cells can be coded. These coded signals are memorised in the memorising means 16.

According to another embodiment of the apparatus according to the invention, which is not shown here, the detection cells may be arranged along the sides of a regular polygon with an even number of sides; this polygon may be a hexagon, for example. Although this other embodiment requires a larger number of detection cells, it makes it unnecessary to use rotational driving means or bearing means for the angle of rotation of the groups of cells, in relation to a reference position; as a result, there is a substantial reduction in the number of coded signals recorded in the memorising means 16 and the processing of these coded signals is simplified. Like the previous one, this other embodiment makes it possible to visualise a section through a body in a specific plane of section, in tomography.

According to another embodiment of the apparatus of the invention, which is not shown, the detection cells may be arranged around a circle, with the organ to be analysed placed inside the circle. Like the previous embodiments, this other embodiment makes it possible to effect visualisation of an organ section in a specific plane of section, in tomography.

According to another embodiment (not shown), the detection cells may be arranged in two identical matrices covering two parallel planar surfaces, respectively, on each side of the body. These surfaces are shown at $S_1$ and $S_2$ and are perpendicular to the plane of the FIGURE; the apparatus can then be used to obtain a spatial display of the body 1; it is obvious that, as in the case where the cells are grouped on two parallel segments, the apparatus in this other embodiment also has means for rotationally moving the matrices of cells, means for fixing the angle $\alpha$ of rotation of the matrices, relative to a reference position, and means for coding and memorising the values of this rotation angle, which are connected to the processing means 17.

According to another embodiment of the apparatus, the detection cells are assembled in matrices of cells covering, respectively, the faces of a regular polygonal cylinder having an even number of faces, such as a cylinder with a hexagonal base, for example, the axis of which is perpendicular to the plane of the FIGURE. These matrices of cells are associated with the same means as those shown in the FIGURE. In this case, it is clear that there is no need for rotational driving of the cells. As in the previous embodiment, the apparatus in this other embodiment makes it possible to obtain a spatial display of the body or organ 1.

Finally, according to another embodiment of the apparatus according to the invention, the detection cells may be assembled in a matrix on the surface of a cylinder whose axis is perpendicular to the plane of the FIGURE. As in the previous embodiment, these matrices of cells are associated with the same means as those shown in the FIGURE. In this case, too, there is no rotational movement and the apparatus permits spatial visualisation of the organ or body 1.

Finally, in all the embodiments described hereinbefore, the apparatus may also comprise means for moving the cells in translatory movement parallel to a predetermined direction. These means are not shown in the drawing. They make it possible to displace the cells, for example, parallel to a direction perpendicular to the plane of the FIGURE. The values of these displacements may be coded, for example by the coding means 25, receiving at an input 30 signals representing these displacements relative to a reference position.

Obviously, this translatory displacement is useful when the detection cells are situated on two parallel segments, on the sides of a regular polygon or in a circle. In fact, thanks to this displacement, the body or organ 1 can be visualised in successive planes of section. This displacement may also be useful if, in spite of a matrix arrangement, one of the dimensions of the cell matrices is smaller than the largest dimension of the body or organ 1.

The invention is not limited to the embodiments described and represented hereinbefore and various modifications can be made thereto without passing beyond the scope of the invention.

What is claimed is:

1. An apparatus for visualising a body by detecting the radiation of a tracer contained in this body and consisting of positron emitters, comprising:
    detection cells situated on each side of the body and permitting detection of the $\gamma$ particles released by each positron emitter in two opposite directions;
    means for locating cells arranged in pairs opposite one another, on each side of the body, each pair of opposing cells being located on a straight line passing through a positron emitter;
    means for coding the location of said pairs of opposing cells;
    means for memorising these coded location signals;
    means for processing these coded and memorised signals;
    visualisation means, controlled by the processing means, for visualising the image of the body from the different signals coded and memorised; this apparatus further comprising:
    means connected to the detection cells for measuring the differences in travel time of the $\gamma$ particles emitted by each emitter, towards corresponding pairs of opposing cells;
    means for coding the values of these differences in travel times, these coding means being connected to the memorising means for also memorising coded signals representing the values of the differences in travel times, and so that the processing means receive the additional coded and memorised values representing the differences in travel times, for visualising the image of the body.

2. Visualisation apparatus according to claim 1, wherein the means for measuring differences in travel times comprise means for converting time into amplitude.

3. Apparatus according to claim 1, wherein each detection cell comprises a scintillator of sodium iodide doped with thallium.

4. An apparatus according to claim 1, wherein each detection cell comprises a plastic scintillator.

5. An apparatus according to claim 1, wherein each detection cell comprises a scintillator of caesium fluoride.

6. An apparatus according to claim 2, wherein the means for measuring differences in travel times also comprise means for detecting the amplitude threshold, connected to the time-to-amplitude conversion means for eliminating from the measurements those wherein the amplitude exceeds a predetermined amplitude threshold, and said predetermined threshold corresponds to the maximum possible time travel difference, this maximum difference being dependent on the dimensions of the body to be visualised.

7. An apparatus according to claim 1, wherein the detection cells are assembled in two identical matrices of cells, covering, respectively, two parallel planar surfaces on each side of the body, these two matrices being associated with means for moving them rotationally around the body, with means for fixing the angle of rotation of said matrices, relative to a reference position, and with means for encoding and memorising the values of this rotation angle, which are connected to the processing means.

8. An apparatus according to claim 1, wherein the detection cells are assembled in two identical groups of cells arranged in linear manner on two respective parallel line segments, on each side of the body, these two groups of cells being associated with means for driving them in rotation around the body, and with means for fixing the angle of rotation of the matrices of cells, in relation to a reference position, and with means for encoding and memorising the values of this angle, which are connected to the processing means.

9. An apparatus according to claim 1, wherein the detection cells are assembled in identical matrices of cells covering, respectively, the faces of a regular polygonal cylinder having an even number of faces.

10. An apparatus according to claim 1, wherein the detection cells are arranged on the sides of a regular polygon having an even number of sides.

11. An apparatus according to claim 1, wherein the detection cells are arranged in a matrix on the surface of a cylinder.

12. An apparatus according to claim 1, wherein the detection cells are arranged on a circle.

13. An apparatus according to claim 1, further comprising means for displacing the cells in a translatory motion parallel to a predetermined direction and means for encoding and memorising the value of this displacement, which are connected to the processing means.

14. An apparatus for visualising a body by detecting the radiation from a tracer contained in this body and consisting of positron emitters, comprising:
  detection cells situated on each side of the body and permitting detection of the $\gamma$ particles released by each positron emitter in two opposite directions;
  means for locating cells arranged in pairs opposite one another, on each side of the body, each pair of opposing cells being located on a straight line passing through a positron emitter;
  means for coding the location of said pairs of opposing cells;
  means for memorising these coded location signals;
  means for processing these coded and memorised signals;
  visualisation means, controlled by the processing means, for visualising the image of the body from the different signals coded and memorised;
wherein each detection cell comprises a scintillator consisting of caesium fluoride.

* * * * *